US006907124B1

(12) United States Patent
Glückstad

(10) Patent No.: US 6,907,124 B1
(45) Date of Patent: Jun. 14, 2005

(54) OPTICAL ENCRYPTION AND DECRYPTION METHOD AND SYSTEM

(75) Inventor: Jesper Glückstad, Rodovre (DK)

(73) Assignee: Forskningscenter Riso, Roskilde (DK)

( * ) Notice: Subject to any disclaimer, the term of this patent is extended or adjusted under 35 U.S.C. 154(b) by 0 days.

(21) Appl. No.: 09/719,992

(22) PCT Filed: Jun. 16, 1999

(86) PCT No.: PCT/DK99/00331

§ 371 (c)(1),
(2), (4) Date: Feb. 9, 2001

(87) PCT Pub. No.: WO00/02339

PCT Pub. Date: Jan. 13, 2000

(30) Foreign Application Priority Data

Jul. 3, 1998 (DK) ........................................ 1998 00869
Mar. 15, 1999 (DK) ........................................ 1999 00364

(51) Int. Cl.[7] .............................................. G06K 9/36
(52) U.S. Cl. .......................... 380/205; 380/58; 380/59; 382/276; 359/2; 359/559
(58) Field of Search ...................... 380/205, 58, 59; 382/276; 359/2, 559

(56) References Cited

U.S. PATENT DOCUMENTS

| 5,148,316 A | 9/1992 | Horner et al. |
| 5,903,648 A | 5/1999 | Javidi |
| 6,011,874 A | * 1/2000 | Gluckstad ................... 382/276 |

FOREIGN PATENT DOCUMENTS

| JP | A4073790 | 3/1992 |
| WO | A1-9634307 | 10/1996 |

OTHER PUBLICATIONS

Javidi, Physics Today, vol. 50, No. 3, pp. 27–32 (1997).

* cited by examiner

Primary Examiner—Emmanuel L. Moise
Assistant Examiner—Taghi T. Arani
(74) Attorney, Agent, or Firm—Birch, Stewart, Kolasch & Birch, LLP

(57) ABSTRACT

The invention relates to securing of information utilising optical imaging technologies and more specifically to phase encryption and decryption of images. An image is encrypted into a mask having a plurality of mask resolution elements $(X_m, Y_m)$ by encoding the image using e.g. a phase mask with an encoded phase value $\phi(X_m, Y_m)$ and an encoded amplitude value $a(X_m, Y_m)$, and by further encrypting the mask (using e.g. a spatial light modulator) by addition of an encrypting phase value $\phi_c(X_m, Y_m)$ to the encoded phase value $\phi(X_m, Y_m)$ and by multiplication of an encrypting amplitude value $a_c(X_m, Y_m)$ with the encoded phase value $a(X_m, Y_m)$. The method of decrypting comprises the steps of decrypting the mask by radiating electromagnetic radiation towards the mask and inserting into the path of the electromagnetic radiation a complex spatial electromagnetic radiation modulator comprising modulator resolution elements, the decrypting phase value $\phi_d(X_d, Y_d)$ and the decrypting amplitude value $a_d(X_d, Y_d)$ respectively, of a modulator resolution element $(X_d, Y_d)$ being substantially equal to $-\phi_c(X_m, Y_m)$ and $a_c^{-1}(X_m, Y_m)$.

49 Claims, 9 Drawing Sheets

OPTICAL ENCRYPTION AND DECRYPTION METHOD AND SYSTEM

This application is the national phase under 35 U.S.C. § 371 of PCT International Application No. PCT/DK99/00331 which has an International filing date of Jun. 16, 1999, which designated the United States of America.

FIELD OF THE INVENTION

The invention relates to securing of information utilising imaging technologies and more specifically to phase and amplitude encryption and decryption of images.

BACKGROUND OF THE INVENTION

It is well known to form an image by phase contrast imaging methods in which phase modulation of light is converted into intensity modulation. As opposed to intensity modulation, phase modulation does not involve loss of energy.

In published patent application no. WO 96/34307, which is hereby incorporated by reference, a phase contrast imaging method is disclosed for calculating phasor values of a phase mask for synthesising a desired intensity pattern.

In "Securing Information with Optical Technologies", Bahram Javidi, Physics Today, Vol. 50, No. 3, March 1997, pp 27–32, a method and system for optically securing information is proposed. An image is encrypted in a 4f-lens optical configuration (i.e. comprising two Fourier transforming lenses) by Fourier transforming the image and an input phase mask with a first lens of the 4f-lens system. A Fourier plane phase mask having phasor values $e^{ib(\alpha,\beta)}$ is positioned in the Fourier plane of the first lens and an encrypted image is formed with a second lens that Fourier transforms images in the Fourier plane of the first lens. The encrypted image is decrypted in a similar 4f-lens configuration in which another Fourier plane phase mask (the key) having phasor values $e^{-ib(\alpha,\beta)}$ is positioned in the Fourier plane of the first lens.

It is a disadvantage of the known cryptographic method that encrypting an image both in the object plane and the Fourier plane leads to generation of speckle patterns in the decrypted image thereby corrupting data having been encrypted.

It is another disadvantage of the known cryptographic method that extremely accurate three-dimensional positioning of the phase mask in the Fourier plane is required for successful encryption and decryption.

It is yet another disadvantage of the known cryptographic method that both amplitude and phase have to be recorded in the encrypted mask.

SUMMARY OF THE INVENTION

It is an object of the present invention to provide an apparatus of the above kind which apparatus is robust, compact, and simple to design and relatively cheap to manufacture.

It is another object of the present invention to provide an improved method and apparatus without the above-mentioned disadvantages.

It is still another object of the present invention to provide an improved method and apparatus for optically securing data utilising phase contrast imaging.

According to a first aspect of the present invention, a method is provided of decryption of an encrypted image having a non-encrypted image intensity pattern $I(x',y')$.

According to a second aspect of the present invention, the image is encrypted into a mask having a plurality of mask resolution elements $(x^m, y_m)$ by encoding the image into the mask with an encoded phase value $\phi(x_m, y_m)$ and an encoded amplitude value $a(x_m, y_m)$, and by encrypting the mask by addition of an encrypting phase value $\phi_c(x_m, y_m)$ to the encoded phase value $\phi(x_m, y_m)$ and by multiplication of an encrypting amplitude value $a_c(x_m, y_m)$ with the encoded amplitude value $a(x_m, y_m)$. Thus, each mask resolution element $(x_m, y_m)$ modulates the phase and the amplitude of electromagnetic radiation incident upon it with the complex value $a(x_m, y_m) a_c(x_m, y_m) e^{i\phi(xm, ym) + i\phi c(xm, ym)}$.

The method of decryption comprises the steps of decrypting the mask by radiating electromagnetic radiation towards the mask, and inserting into the path of the electromagnetic radiation a complex spatial electromagnetic radiation modulator comprising modulator resolution elements $(x_d, y_d)$, each modulator resolution element $(x_d, y_d)$ modulating the phase and the amplitude of electromagnetic radiation incident upon it with a predetermined complex value $a_d(x_d, y_d) e^{i\phi d (xd, yd)}$, the decrypting phase value $\phi_d(x_d, y_d)$ and the decrypting amplitude value $a_d(x_d, y_d)$, respectively, of a modulator resolution element $(x_d, y_d)$ being substantially equal to $-\phi_c(x_m, y_m)$ and $a_c^{-1}(x_m, y_m)$, respectively, of a corresponding mask resolution element $(x_m, y_m)$, and imaging the mask and the electromagnetic radiation modulator onto the image having the image intensity pattern $I(x',y')$.

Throughout the present description the combination of the mask and the electromagnetic radiation modulator is denoted an encoder.

According to a third aspect of the present invention, a decryption system is provided for decrypting an encrypted image having a non-encrypted image intensity pattern $I(x', y')$ that has been encoded into a mask having a plurality of mask resolution elements $(x_m, y_m)$ with an encoded phase value $\phi(x_m, y_m)$ and an encoded amplitude value $a(x_m, y_m)$, and encrypted by addition of an encrypting phase value $\phi_c(x_m, y_m)$ to the encoded phase value $\phi(x_m, y_m)$ and by multiplication of an encrypting amplitude value $a_c(x_m, y_m)$ with the encoded amplitude value $a(x_m, y_m)$, each mask resolution element $(x_m, y_m)$ modulating the phase and the amplitude of electromagnetic radiation incident upon it with the complex value $a(x_m, y_m) a_c(x_m, y_m) e^{i\phi(xm, ym) + i\phi c(xm, ym)}$.

The system comprises a source of electromagnetic radiation for emission of electromagnetic radiation for illumination of the mask, a complex spatial electromagnetic radiation modulator that is positioned in the path of the electromagnetic radiation and comprises modulator resolution elements $(x_d, y_d)$, each modulator resolution element $(x_d, y_d)$ modulating the phase and the amplitude of electromagnetic radiation incident upon it with a predetermined complex value $a_d(x_d, y_d) e^{i\phi d(xd, yd)}$. The decrypting phase value $\phi_d(x_d, y_d)$ and the decrypting amplitude value $a_d(x_d, y_d)$, respectively, of a modulator resolution element $(x_d, y_d)$ are substantially equal to $-\phi_c(x_m, y_m)$ and $a_c^{-1}(x_m, y_m)$, respectively, of a corresponding mask resolution element $(x_m, y_m)$.

Further, the system comprises an imaging system for imaging the mask and the electromagnetic radiation modulator onto the image having the image intensity pattern $I(x',y')$.

The complex spatial electromagnetic radiation modulator may be positioned anywhere in the path of the electromagnetic radiation. When the complex modulator is positioned adjacent to the mask, the encrypted mask is decrypted when the decrypting phase value $\phi_d(x_d, y_d)$ and the decrypting amplitude value $a_d(x_d,y_d)$, respectively, of a modulator resolution element $(x_d,y_d)$ being substantially equal to $-\phi_c(x_m,y_m)$ and $a_c^{-1}(x_m,y_m)$, respectively, of a corresponding optically aligned mask resolution element $(x_m,y_m)$. The mask and the decrypting complex modulator are optically aligned when corresponding mask resolution elements $(x_m,y_m)$ and complex modulator resolution elements $(x_d,y_d)$ are imaged onto the same desired resolution element $(x',y')$ of the image having the image intensity pattern $I(x', y')$.

For example, the complex modulator may be physically positioned remotely from the mask and imaged onto the position of the mask whereby the complex modulator is virtually positioned adjacent to the mask. Thus, the complex modulator may be positioned virtually or physically in another position than adjacent to the mask still performing the decrypting function when the amplitude and phase values of the complex modulator are transformed accordingly, e.g. by a Fresnel propagator.

As already mentioned, the optically aligned combination of the mask and the decrypting complex modulator is denoted the encoder. The virtual mask resolution elements of the encoder are denoted $(x,y)$ and thus for optically aligned resolution elements, each of resolution elements $(x,y)$ and $(x_m,y_m)$ and $(x_d,y_d)$ is imaged onto the same image resolution element $(x',y')$. For example when the mask and the complex modulator are positioned adjacent each other:

$$(x,y)=(x_m,y_m)=(x_d,y_d).$$

It is an important advantage of the present invention that the encrypted image may selectively require recording in the mask of phase values or amplitude values or a combination thereof.

It is another advantage of the present invention that decryption is performed in a plane adjacent to the mask or an equivalent plane whereby generation of speckles in the decrypted image is suppressed.

It is yet another advantage of the present invention that there is no requirement of positioning a radiation modulator in the Fourier plane whereby an accurate three-dimensional positioning requirement is avoided.

It is still another advantage of the present invention that only a single key for encryption is required.

It is preferred to encode the non-encrypted image into a phase mask and encrypt the phase mask by adding encrypting phase values to the encoded phase values. An encrypted phase mask is extremely difficult—if not impossible—to replicate by counterfeiters. Further, phase masks may be readily produced while masks requiring recording of both amplitude and phase are extremely complicated to produce, typically requiring production of two masks to be accurately superpositioned. The same applies to the decrypting complex modulator.

The imaging may be performed with a common path interferometer, such as a phase contrast imaging system, a dark field imaging system, a field absorption imaging system, a point diffraction imaging system, a Smartt interferometer, a Schlieren interferometer, etc, and any combination hereof.

Thus, the imaging for reconstruction of the intensity pattern $I(x',y')$ may comprise:

Spatial modulation of electromagnetic radiation with the encoder for modulation of the phase of the incident electromagnetic radiation by phasor values of individual resolution elements of the encoder, each phasor value $e^{i\phi(x,y)}$ being determined in such a way that 1) the values of the Fourier transformed phasors attains predetermined values for predetermined spatial frequencies, and 2) the phasor value of a specific resolution element of the encoder corresponds to a distinct intensity level of the image of the resolution element in the intensity pattern, Spatial phase filtering of electromagnetic radiation with a spatial phase filter for phase shifting of a part of the electromagnetic radiation, and Generating the intensity pattern $I(x',y')$ by interference in the image plane of an imaging system between the part of the electromagnetic radiation that has been phase shifted by the phase filter and the remaining part of the electromagnetic radiation.

Preferably, the method of decryption further comprises the steps of, and the decryption system further comprises means for Fourier or Fresnel transforming electromagnetic radiation modulated by the mask and the complex spatial electromagnetic radiation modulator, Filtering the Fourier or Fresnel transformed electromagnetic radiation by, in a region of spatial frequencies comprising DC in the Fourier or Fresnel plane, phase shifting with a predetermined phase shift value θ the modulated electromagnetic radiation in relation to the remaining part of the electromagnetic radiation, and multiplying the amplitude of the modulated electromagnetic radiation with a constant B, and in a region of remaining spatial frequencies in the Fourier or Fresnel plane, multiplying the amplitude of the modulated electromagnetic radiation with a constant A, forming the intensity pattern by Fourier or Fresnel transforming, respectively, the phase shifted Fourier or Fresnel transformed modulated electromagnetic radiation, whereby each resolution element $(x_m,y_m)$ of the mask is imaged on a corresponding resolution element $(x',y')$ of the image, the filtering parameters A, B, θ substantially fulfilling the equation $$I(x',y')=A^2|a(x',y')e^{i\phi(x',y')}+\bar{\alpha}(BA^{-1}e^{i\theta}-1)|^2$$

$\bar{\alpha}$ being the average of the complex phasors $a(x,y)e^{i\phi(x,y)}$ of the encoder.

It should be noted that, in each resolution element of the encoder, one of two phasor values which represent a particular grey level of the intensity pattern $I(x',y')$ may be selected.

It is further preferred that the filtering parameters A and B substantially fulfil that A=1 and B=1.

Preferably, the absorption of the mask is substantially uniform.

It is also preferred that the phase shift value θ substantially fulfils the equation $$|\bar{\alpha}| = \frac{1}{2\left|\sin\frac{\theta}{2}\right|}$$

and in this case $$I(x', y') = 2\left[1 \mp \sin\left(\phi_{\bar{\alpha}} - \phi(x', y') + \frac{\theta}{2}\right)\right]$$

For selected phase shift values $\phi$, $\phi_{\bar{\alpha}}$ being the phase of $\bar{\alpha}$.

In a preferred embodiment of the present invention, the phase shift θ is substantially equal to π. According the previous equation θ=π leads to $|\bar{\alpha}|=\frac{1}{2}$, and then the phasor values $e^{i\phi(x,y)}$ of the encoder may be calculated in accordance with $$I(x',y')=2(1-\cos(\phi(x',y')))$$

$$\int_{encoder}\int \sin(\phi(x,y))dx\,dy = 0.$$

Although, the present methods of encryption and decryption are related to encoding in two spatial dimensions (planar encoding), the principles of the methods may be utilised for encoding in one to three spatial dimensions and/or in the temporal dimension.

The electromagnetic radiation may be of any frequency range of the electromagnetic spectrum, i.e. the gamma frequency range, the ultraviolet range, the visible range, the infrared range, the far infrared range, the X-ray range, the microwave range, the HF (high frequency) range, etc. The present invention is also applicable to particle radiation, such as electron radiation, neutron radiation, etc.

Preferably, the electromagnetic radiation is monochromatic or quasi-monochromatic so that the energy of the electromagnetic radiation is concentrated in a narrow frequency bandwidth. Since the intensity pattern is reconstructed by interference of two electromagnetic waves emitted from a common source of electromagnetic radiation, the phases of which have been changed differently, it is required that the frequency range of the emitted electromagnetic radiation is sufficiently narrow to ensure that the two waves of electromagnetic radiation are coherent so that their superposition generates the desired intensity pattern. If the frequency range is too broad, the two waves will be incoherent and the phase information will be lost as superposition of non-coherent waves results in a summation of the intensities of the two waves. It is required that the difference between individual delays of electromagnetic radiation to be superpositioned is less than the wavelength of the radiation. This is a relaxed requirement that allows the electromagnetic radiation to be relatively broad-banded. For example in the visible range a Xe-lamp or a Hg-lamp can be used as a light source in a system according to the present invention with the advantage compared to a laser light source that speckle noise is reduced. The requirements of the spatial coherence of the electromagnetic radiation depend upon the space bandwidth product of the corresponding system and how close the required system performance is to the theoretically obtainable performance of the system.

Preferably, the electromagnetic radiation is generated by a coherent source of electromagnetic radiation, such as a laser, a maser, a phaselocked laser diode array, etc. However a high pressure arc lamp, such as a Hg lamp, a Xe lamp, etc, may also be used and even an incandescent lamp may be used as a source of electromagnetic radiation in a low performance system.

The encoder changes the phase of an electromagnetic wave incident upon it. The encoder may transmit or reflect the incident electromagnetic wave. The encoder is divided into a number of resolution elements, each of which modulates the incident electromagnetic wave by changing its phase by a specific predetermined value. The predetermined values are assigned to each resolution element in different ways depending upon the technology applied in the component. For example in spatial light modulators, each resolution element may be addressed either optically or electrically. The electrical addressing technique resembles the addressing technique of solid-state memories in that each resolution element can be addressed through electronic circuitry to receive a control signal corresponding to the phase change to be generated by the addressed resolution element. The optical addressing technique addresses each resolution element by pointing a light beam on it, the intensity of the light beam corresponding to the phase change to be generated by the resolution element illuminated by the light beam.

Spatial phase modulation may be realised utilising fixed phase masks, devices comprising liquid crystals and being based on liquid crystal display technology, dynamic mirror devices, digital micro-mirror arrays, deformable mirror devices, membrane spatial light modulators, laser diode arrays (integrated light source and phase modulator), smart pixel arrays, etc.

A spatial phase filter is typically a fixed phase mask, such as an optically flat glass plate coated with a dielectric layer at specific positions of the glass plate. However, the spatial phase modulators mentioned in the previous section may also be used for spatial phase filters.

The imaging system maps the phase modulating resolution elements of the encoder on the target surface of the reconstructed intensity patter. It may comprise a 4f-lens configuration (two Fourier transforming lenses utilising transmission of light or one Fourier transforming lens utilising reflection of light) or a single imaging lens. However, any optical imaging system providing a filtering plane for the spatial phase filter may be applied in a phase contrast imaging system.

In the method of decryption according to the present invention, the reconstructed intensity pattern is generated by superposition of two electromagnetic waves in the image plane of the imaging system. The encoder changes the phase values of an electromagnetic wave incident upon it and the imaging system directs the electromagnetic wave with changed phases reflected from or transmitted through the encoder towards the spatial phase filter. The phase filter phase shifts a part of the electromagnetic radiation and the imaging system is adapted to superimpose in the image plane the phase shifted part of the electromagnetic radiation with the part of the electromagnetic radiation that is not phase shifted by the spatial phase filter.

According to a preferred embodiment of the invention, the encoder is positioned at the front focal plane of a lens while the spatial phase filter is positioned in the back focal plane of the lens, whereby a first electromagnetic field at the encoder is Fourier transformed by the lens into a second electromagnetic field at the phase filter. Thus, specific spatial frequencies of the first electromagnetic field will be transmitted through the spatial phase filter at specific positions of the phase filter. For instance, the energy of the electromagnetic radiation at zero frequency (DC) is transmitted through the phase filter at the intersecting point of the Fourier plane and the optical axis of the lens also denoted the zero-order diffraction region.

It is presently preferred that the spatial phase filter is adapted to phase shift the DC-part of the electromagnetic radiation and to leave the remaining part of the electromagnetic radiation unchanged or, alternatively, to leave the DC-part of the electromagnetic radiation unchanged and to phase shift the remaining part of the electromagnetic radiation. The last alternative is preferred when the energy level of the DC-part of the electromagnetic radiation is so high that the phase shifting part of the phase filter will be destroyed by it. For example in laser cutting, the DC level of the laser beam can be so high that a phase shifting dot positioned at the intersecting point of the DC part of the laser beam at the phase filter would evaporate. It is also possible to block the electromagnetic radiation (no transmittance) in the zero-order diffraction region, however, the DC energy of the radiation is then lost.

Below, an expression that is valid for phase modulation of the intensity of the reconstructed intensity pattern as a function of the phasor values $e^{i\phi(x,y)}$ of the encoder, when the DC-part of the electromagnetic radiation is phase shifted, is deduced.

Electromagnetic radiation incident on the encoder can be described by a function A(x,y), where A(x,y) is a complex number (amplitude and phase) of the incident field on the resolution element (x,y) of the encoder. At the resolution element (x,y), the encoder modulates the phase of the incident radiation with a value $\phi(x,y)$ so that the field after reflection by or transmission through the encoder may be described by the function $A(x,y)* e^{i\phi(x,y)}$, $e^{i\phi(x,y)}$ being the phasor value of the resolution element (x,y) of the encoder. As A(x,y) preferably is a constant value over the entire surface of the encoder, the term is left out of the following equations for simplicity.

The expression of the electromagnetic radiation incident on the spatial phase filter may now be separated into an AC-term and a DC-term. If the DC-term of the field is denoted $\bar{\alpha}$, the AC-term of the field is given by the term $e^{i\phi}_{(x,y)} - \bar{\alpha}$. Since the spatial phase filter changes the phase of the DC-part of the electromagnetic radiation by θ, the intensity of the reconstructed intensity pattern at the image plane of the imaging system is given by:

$$I(x',y') = |e^{i\phi(x,y)} + \bar{\alpha}(e^{i\theta} - 1)|^2$$

wherein (x',y') is the co-ordinates of the image of the resolution element (x,y) of the encoder formed by the imaging system in the image plane.

It should be noted that the second term of the equation is a complex number that adds to the phasors $e^{i\phi(x,y)}$ of the encoder and may be interpreted as a contrast control parameter or the reconstructed intensity pattern I(x',y').

According to a preferred embodiment of the invention, the average value of the phasors is adjusted in order to control the range of intensity levels.

Instead of phase shifting the DC-part of the electromagnetic radiation, it is also possible to synthesise a prescribed intensity pattern by phase shifting other parts of the electromagnetic radiation by adapting the spatial phase filter to phase shift electromagnetic radiation incident upon one or more arbitrary regions of the phase filter and leaving the phase of the remaining part of the electromagnetic radiation unchanged and then superimposing the two parts of the electromagnetic radiation. The corresponding mathematics and the corresponding design procedures for the encoder and spatial phase filter will of course be more complicated than for the method described in the previous section.

A simple example of phase shifting a part of the electromagnetic radiation of a spatial frequency different from the zero frequency is provided by moving the DC-part of the electromagnetic radiation to another spatial frequency in the Fourier plane (identical to the plane of the spatial phase filter) utilising an optical component with an appropriate carrier frequency (i.e. a grating or a prism) or, preferably, encoding the function of a grating or a prism into the encoder, and adapting the spatial phase filter to change the phase of the electromagnetic radiation at this spatial frequency and to leave the phase of the remaining part of the electromagnetic radiation unchanged.

According to another preferred embodiment of the invention, the encoder is not positioned in the back focal plane of the lens but in the Fresnel region of the lens instead. In this case, the electromagnetic field at the phase filter will be given by a Fresnel transformation of the electromagnetic field at the encoder. This further complicates the mathematics and the design procedures, for example the term in equation (7) below has to be substituted by the value of the Fresnel transformation at the point(s) of phase changes of the phase filter. However, the Fresnel transformation may be calculated from a Fourier transformation by multiplication of the phasor values of the encoder by a quadratic phase factor followed by a Fourier transformation.

It is an important aspect of the present invention that each intensity level of the reconstructed intensity pattern for each resolution element may be generated by at least two different phasor values of a resolution element of the encoder.

For example, when the spatial phase filter phase shifts the DC-part of the electromagnetic radiation, it will be shown later that, advantageously, the average $\bar{\alpha}$ of the phasors of the resolution elements of the encoder should be equal to ½ and the value of the phase shift θ should be equal to π. In this case, the intensity of the reconstructed image pattern at the image (x',y') of the resolution element (x,y) will be given by:

$$I(x',y') = 2(1 - \cos \phi(x',y'))$$

It is seen that complex conjugate phasors (values of φ of opposite sign) result in identical intensity levels I(x',y'). It can be shown that for any value of the modulus of the average of the phasors $|\bar{\alpha}|$ two phasors exist that will generate identical intensity levels of the reconstructed intensity pattern.

Further, if the spatial phase filter phase shifts parts of the electromagnetic radiation different from the DC-part, the phasor value that generates a specific intensity level will depend on the position of the resolution element in question, i.e. the phasor value and the position of the resolution element with that phasor value together define the intensity level at the image of the resolution element in the reconstructed intensity pattern. Still, it is true that for each resolution element of the encoder, each intensity level of the reconstructed intensity pattern may be represented by one of two different phasors of complementary phase values.

This freedom of being able to select, for each intensity level to be generated and for each resolution element of the encoder, one of two phasors is used to control the phase of the Fourier transform of the phasors at specific spatial frequencies by selection of phasors with appropriate phase values to ensure two intervals of biunique functional dependence between phasor values and corresponding intensity values.

This freedom of choice of phasors may be utilised to select phasors of neighbouring resolution elements of the encoder with a maximum difference between them, thereby generating an electromagnetic radiation emitted from the encoder with a maximum content of high spatial frequencies which will generate a good separation of the DC part of the electromagnetic radiation from its AC part. However, any other strategy of selecting between two possible phasor values of each resolution element may be chosen to generate a desired spatial frequency content of the electromagnetic radiation.

Preferably, the phase of the Fourier transform of the phasors at specific spatial frequencies is adjusted in order to control whether the relation between each phasor and the corresponding intensity level is a monotonic increasing or a monotonic decreasing function.

Below, a set of different steps that may be incorporated—either alone or in combination—into the method of encryption is described. They are provided according to the present invention for adjustment of the modulus of the Fourier transform of the phasors at specific spatial frequencies to attain a prescribed value.

According to one of the steps, the individual phasors of the resolution elements of the encoder are adjusted by a constant value until the desired value of the modulus of the Fourier transform of the phasors at specific spatial frequencies is attained while maintaining prescribed relative intensity levels between intensities of resolution elements of the intensity pattern, i.e. iteratively.

According to another step, the individual phasors of the resolution elements of the encoder are adjusted utilising histogram techniques known from image processing. A histogram is a bar chart showing the number of resolution elements of the reconstructed intensity pattern with a specific intensity value as a function of the intensity value. Any histogram technique, such as histogram equalisation, adapting the histogram to a predetermined distribution, etc., may be used iteratively until the modulus of the Fourier transform of the phasors at specific spatial frequencies attain the prescribed value.

According to yet another step, the phasor pattern of the encoder is spatially scaled in order to adjust the modulus of the Fourier transform of the phasors at specific spatial frequencies.

According to still another step, the modulus of the Fourier transform of the phasors at specific spatial frequencies is adjusted utilising half tone coding techniques, such as raster techniques, area ratio modulation, spot diameter modulation, etc.

Each complex phasor $a(x,y)e^{i\phi(x,y)}$ of the encoder may be selected from a set of two determined phasors with complementary complex phasor values $a(x,y)e^{i\phi1(x,y)}$ and $a(x,y)e^{i\phi2(x,y)}$ in such a way that a specific spatial frequency distribution of the intensity of the electromagnetic radiation in the Fourier or Fresnel plane is attained.

The phase $\phi(x,y)$ of complex phasors $a(x,y)e^{i\phi(x,y)}$ of adjacent resolution elements may alternate between the two possible complementary complex phasor values $a(x,y)e^{i\phi1(x,y)}$ and $a(x,y)e^{i\phi2(x,y)}$.

The complex phasors $a(x,y)e^{i\phi1(x,y)}$ and $a(x,y)e^{i\phi2(x,y)}$ may be complex conjugated.

It is seen from the description above that the intensity levels may differ from one reconstructed intensity pattern to the next as a consequence of the adjustments of the modulus of the Fourier transform of the phasors at specific spatial frequencies. Thus, it is preferred to control the power of the radiation source in dependence of the intensity range of the intensity pattern so that a sequence of different intensity patterns shows uniform intensity levels.

According to a preferred embodiment of the invention, the shape of the phase filter is adapted to match the spatial frequency content of the phasors of the encoder, e.g. to optimise the desired separation of the part of the electromagnetic radiation to be phase filtered from the remaining part of the electromagnetic radiation.

It is within the scope of the present invention that the imaging system further comprises zooming means for variable scaling of the reconstructed intensity pattern. The zooming of the imaging system may be dynamically controllable, e.g. in response to the scaling of the pattern of phasor values of the encoder.

According to the present invention, the power of the radiation source may be controllable in response to the spatial scaling of the pattern in the encoder and/or the zooming of the focusing system.

In order to provide a compact and integrated system according to the present invention, the optical function of a Fourier-transforming lens is encoded into the phasors of the encoder. The Fourier transforming lens may be refractively or diffractively encoded.

Similarly, the optical function of an output lens may be encoded into the phase filter either refractively or diffractively.

Further, compensation may be encoded into the phasor values of the encoder so that part of the electromagnetic radiation modulated by the encoder has a substantially flat intensity profile in the image plane. Without this compensation, part of the electromagnetic radiation modulated by the encoder will have a flat profile with perturbations resulting from the phase filtering superpositioned upon it. This may cause "ringings" (oscillations) at the edges of the reconstructed intensity pattern.

According to another preferred embodiment of the invention, the source of electromagnetic radiation comprises one or more light sources of different wavelengths corresponding to three different colours, such as red, green and blue, for generation of intensity patterns of arbitrary colours. Further, several independent systems each one illuminated by its own wavelength can be combined into a single multi-wavelength system.

According to yet another preferred embodiment of the present invention, the phasor values of the resolution elements of the mask and the electromagnetic radiation modulator are binary, i.e. each phasor value is selected from a set constituted by two values, for example 1 and −1 (corresponding to phase values 0 and $\pi$, respectively). It is further preferred that the random distribution of the decrypting binary phasor values is uniform.

It is also preferred that the binary values are selected so that encryption and decryption correspond to a binary XOR logical operation since the XOR operation provides maximum ambiguity as to which inputs generate a specific output.

It is even more preferred that there is no spatial correlation between resolution elements in the encoded, non-encrypted phase pattern.

The reconstructed intensity pattern $I(x',y')$ may be detected by a camera, such as a CCD camera, and the recorded image may be transmitted to a computer for recognition of the image $I(x',y')$ and thus, authentication of the encrypted mask.

DETAILED DESCRIPTION OF PREFERRED EMBODIMENTS

Figure 1:
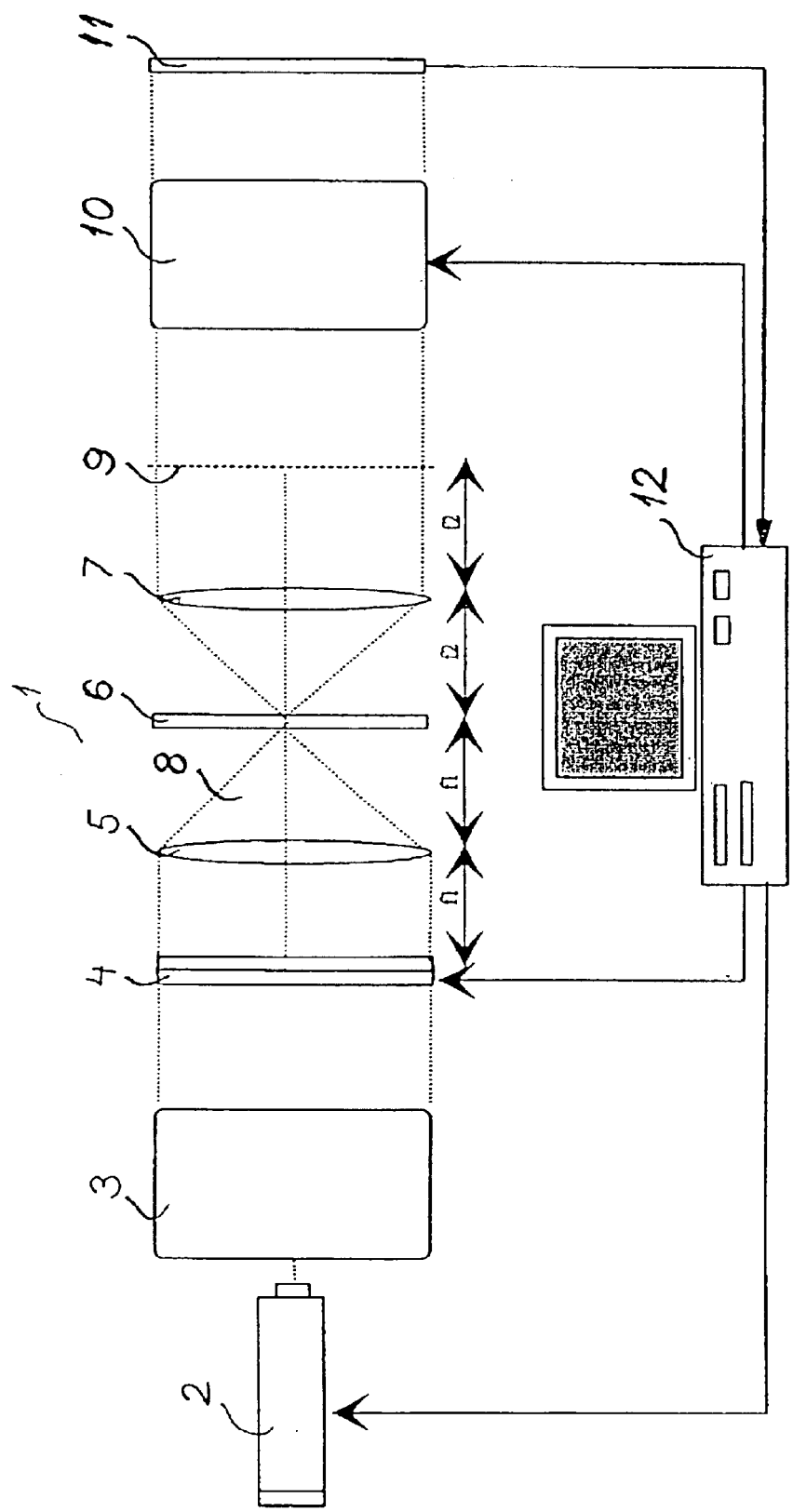
FIG. 1 shows a 4f common path interferometer.

FIG. 1 shows a 4f common path interferometer 1. A laser 2 emits a light beam which is expanded by a beam expander 3 into a plane light wave of uniform intensity and directs it towards an encoder 4, i.e. a combination of an encrypted mask 4a and a decrypting complex spatial electromagnetic radiation modulator 4b. The light beam is transmitted through the encoder 4 and a Fourier transforming lens 5. The encoder 4 is positioned in the front focal plane of the lens 5 and a spatial filter 6 is positioned in the back focal plane of the lens 5 that is also the front focal plane of a lens 7. The Fourier transforming lenses 5, 7 need not have identical focal lengths. Different focal lengths lead to a magnification ratio different from one. The filter 6 phase shifts by θ and optionally attenuates (by a factor B) the zero order diffraction part 8 of the light modulated by the encoder 4. Optionally, the remaining diffraction part of the light modulated by the encoder 4 may be attenuated by a factor A. The reconstructed intensity pattern is generated in the back focal plane 9 of the lens 7 and a dynamic focusing system 10 images the reconstructed intensity pattern I(x',y') onto a focusing plane 11. The reconstructed intensity pattern I(x',y') may be detected by a camera, such as a CCD camera, and the recorded image may be transmitted to a computer 12 for recognition of the image I(x',y') and thus, authentication of the encrypted mask 4a.

The computer 12 controls the optical system. The computer 12 comprises interface means for addressing each of the resolution elements of the complex spatial electromagnetic radiation modulator 4b and transmitting a decrypting value to the addressed resolution element Alternatively, the complex spatial electromagnetic radiation modulator 4b may be a fixed mask i.e. a mask manufactured with fixed modulating values of the resolution elements.

Optionally, the phase shift θ and attenuation factors (A, B) of the filter 6 is adjustable and controllable by optional phase control means of the computer 12 which may be further adapted to adjust the phase shift, e.g. utilising equation 18.

Figure 2:
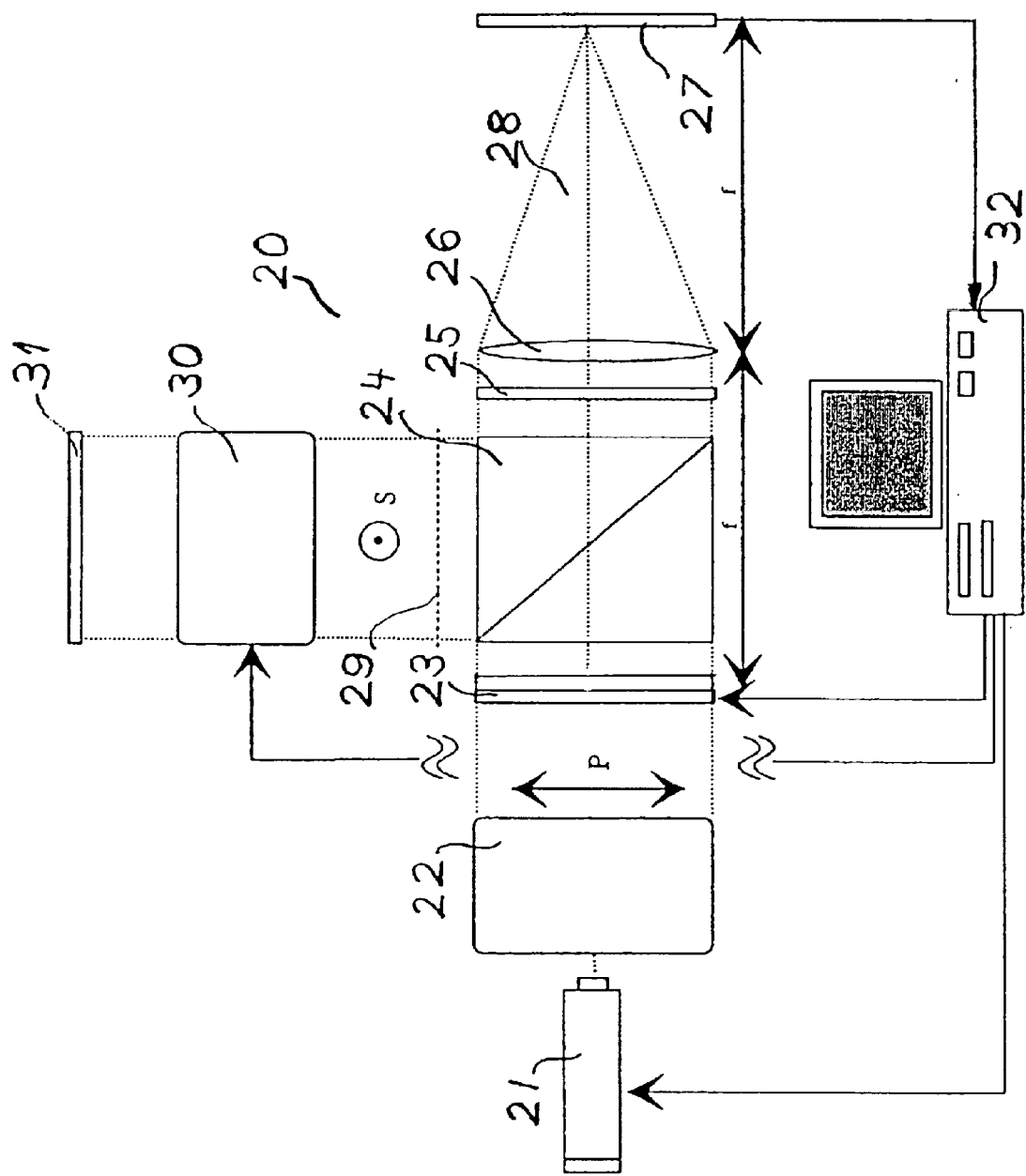
FIG. 2 shows a 2f common path interferometer.

FIG. 2 shows a 2f common path interferometer 20. A laser 21 emits a light beam which is expanded by a beam expander 22 into a plane light wave of uniform intensity and directs it towards an encoder 23, i.e. a combination of an encrypted mask 23a and a complex spatial electromagnetic radiation modulator 23b and a polarisation beam splitter 24 and a quarter-wave plate 25. The polarisation beam splitter 24 and the quarter-wave plate 25 allows beam-splitting of light of a specific linear polarisation without the power loss associated with conventional beam-splitters due to splitting of the beam in both directions of transmission through the beam-splitter. After transmission through the polarisation beam splitter 24 and the quarter-wave plate 25, the light beam is transmitted through a Fourier transforming lens 26 and is reflected from a spatial filter 27. The encoder 23 is positioned in the front focal plane of the lens 26 and the spatial filter 27 is positioned in the back focal plane of the lens 26. The filter 27 phase shifts by θ and optionally attenuates (by a factor B) the zero order diffraction part 28 of the light modulated by the encoder 23. Optionally, the remaining diffraction part of the light modulated by the encoder 23 may be attenuated by a factor A. The reconstructed intensity pattern I(x',y') is generated in the back focal plane 29 of the lens 26 and a dynamic focusing system 30 images the reconstructed intensity pattern I(x',y') onto a focusing plane 31. As described for the system shown in FIG. 1, the image I(x',y') may be detected with a camera and transmitted to a computer 32 for processing and authentication and the system 20 may also be controlled by the computer 32.

Figure 3:
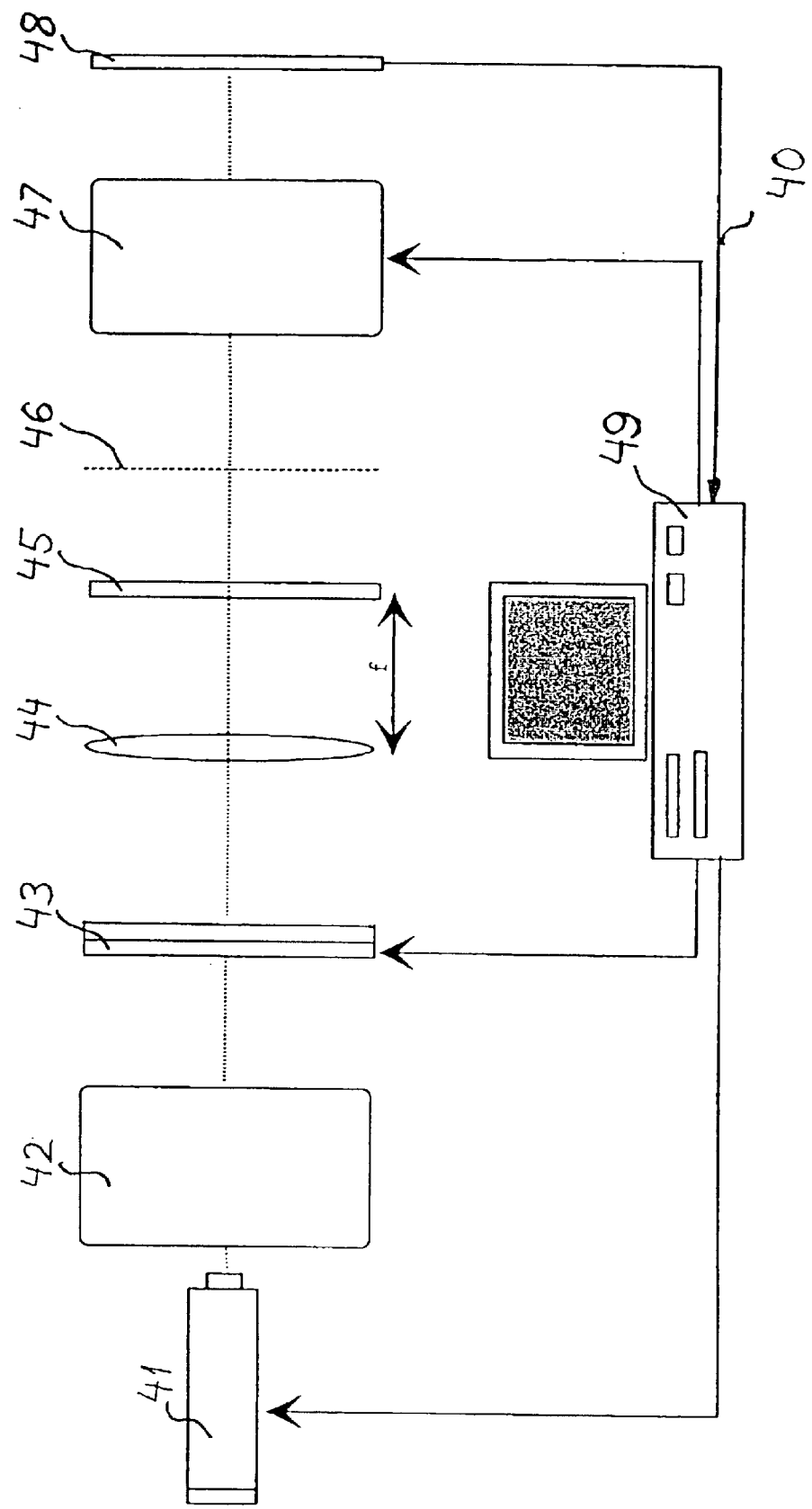
FIG. 3 shows a 1f common path interferometer.

FIG. 3 shows a 1f common path interferometer 40. A laser 41 emits a light beam which is expanded by a beam expander 42 into a plane light wave of uniform intensity and directs it towards an encoder 43, i.e. a combination of an encrypted mask 43a and a complex spatial electromagnetic radiation modulator 43b. The light beam is transmitted through the encoder 43 and an image forming lens 44. The filter 45 phase shifts by θ and optionally attenuates (by a factor B) the zero order diffraction part of the light modulated by the encoder 43. Optionally, the remaining diffraction part of the light modulated by the encoder 43 may be attenuated by a factor A. The reconstructed intensity pattern is generated in the image plane 46 of the lens 44 and a dynamic focusing system 47 images the reconstructed intensity pattern I(x',y') onto a focusing plane 48. As described for the system shown in FIG. 1, the image I(x',y') may be detected with a camera and transmitted to a computer 49 for processing and authentication and the system 40 may also be controlled by the computer 49.

Figure 4:
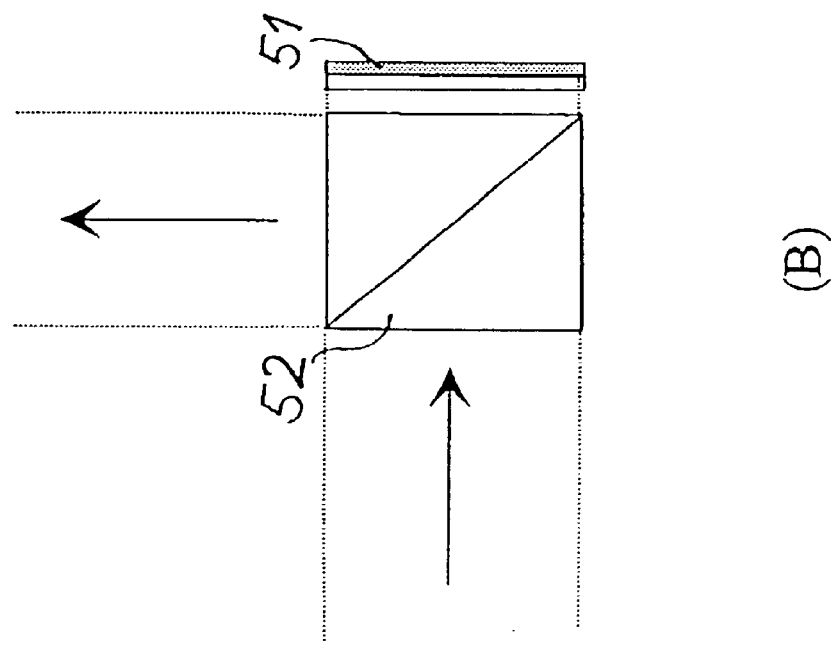
FIG. 4 shows (A) off-axis read-out of reflective SLM and (B) on-axis read-out of reflective SLM.
Figure 4:
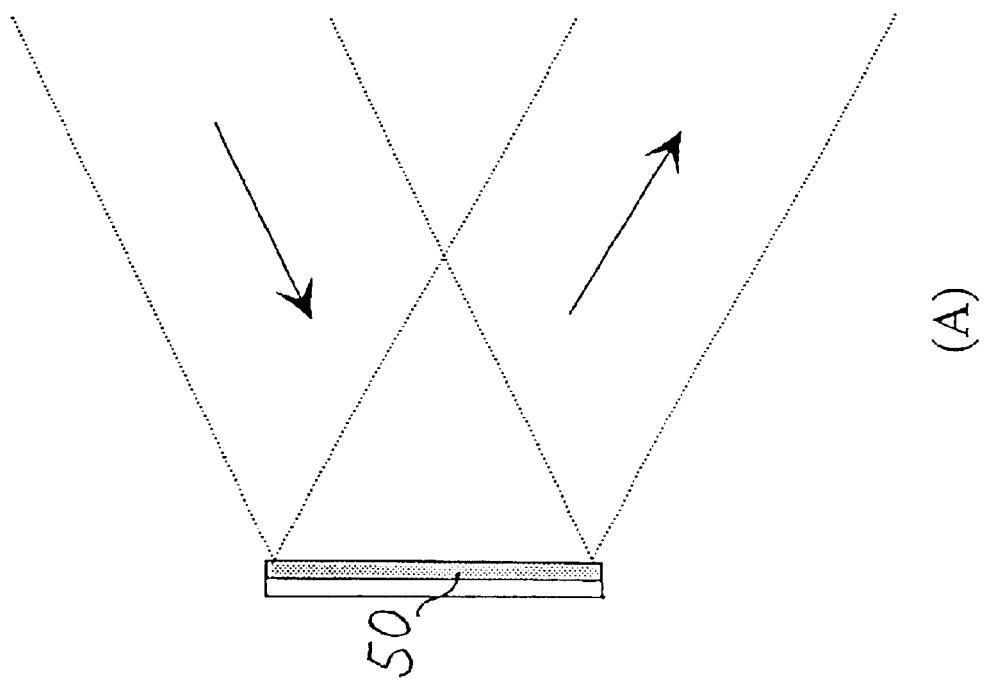

FIG. 4 shows details of (FIG. 4A) an off-axis read-out of an encoder 50 comprising a combination of a reflective mask 50a and a complex spatial electromagnetic radiation modulator 50b and of (FIG. 4B) an on-axis read-out of an encoder 51 comprising a combination of a reflective mask 51a and a complex spatial electromagnetic radiation modulator 51b with a beam splitter 52. Both configurations (FIG. 4A, FIG. 4B) may be utilised in the systems shown in FIGS. 1–3.

Phase Encoding for Dc Phase Filtering

In the following an example of encoding an encoder and a spatial phase filter will be given based on a system filtering in the DC-frequency range. The exemplified system is based on a 4-f lens configuration as shown in FIG. 1 and illuminated by electromagnetic radiation in the visible frequency domain, hereafter simply denoted as fight radiation.

Assuming that the illuminating light is monochromatic and has a substantially flat amplitude profile we obtain the following spatial amplitude distribution emitted from the encoder $$a(x, y) = rect\left(\frac{x}{\Delta x}, \frac{y}{\Delta y}\right)\exp(i\phi(x, y)) \quad (1)$$

where α(x, y)=exp(iφ(x, y)) represent the spatially encoded phasor values and ΔxΔy is the area of the input phase modulating spatial light modulator.

It turns out to be convenient to separate α(x, y) into two terms describing a spatially invariant DC-value, $\bar{\alpha}$, and a spatially varying AC-contribution Δα(x, y). The DC-value can be found as:

$$\bar{\alpha} = \frac{1}{\Delta x \Delta y}\int_{\Delta x}\int_{\Delta y}\exp(i\phi(x, y))\,dx\,dy \quad (2)$$

Subsequently the AC-term is expressed by:

$$\Delta\alpha(x, y) = \exp(i\phi(x, y)) - \frac{1}{\Delta x \Delta y}\int_{\Delta x}\int_{\Delta y}\exp(i\phi(x, y))\,dx\,dy \quad (3)$$

The separation of α(x, y) into a spatially invariant DC-term and a spatially varying AC-term is an important point and will be used throughout the remaining part of this example, specially in the description of the spatial filtering procedure.

The spatial filter utilised in this example is chosen as a circular phase contrast filter (different transverse shapes can also be used) centred around origo in the spatial frequency domain, denoted by co-ordinates ($f_x$, $f_y$):

$$T(f_r) = 1 + (\exp(i\theta) - 1) circ\left(\frac{f_r}{\Delta f_r}\right), \quad (4)$$

where $f_r = \sqrt{f_{x^2} + f_{y^2}}$ denotes radial spatial frequency and $\Delta f_r$, describes the size of the circular (circ) phase filter.

In the spatial frequency domain (the filtering plane) the Fourier transformation ($\Im$) of the spatially modulated light radiation from the encoder is present. The filtering operation on the Fourier transformed light radiation performed by the spatial phase contrast filter can be expressed as a simple point-by-point multiplication procedure. Subsequently the spatially filtered light is inverse Fourier transformed ($\Im^{-1}$) by the second Fourier lens (Fourier transformation and reflected output co-ordinates) and the resulting spatial amplitude distribution in the image plane (with co-ordinates (x', y')) can accordingly be written as:

$$o(x', y') = a(x', y') + (\exp(i\theta) - 1)\Im^{-1}\left(\Im(a(x, y)) circ\left(\frac{f_r}{\Delta f_r}\right)\right) \quad (5)$$

$$\cong a(x', y') + \overline{\alpha}(\exp(i\theta) - 1) rect\left(\frac{x'}{\Delta x}, \frac{y'}{\Delta y}\right)$$

$$= [\exp(i\phi(x', y')) + \overline{\alpha}(\exp(i\theta) - 1)] rect\left(\frac{x'}{\Delta x}, \frac{y'}{\Delta y}\right)$$

Within the illumination-region, $(x',y') \in \Re$ outlined by $$rect\left(\frac{x'}{\Delta x}, \frac{y'}{\Delta y}\right),$$

one obtains:

$$|o(x', y')|^2 \cong 1 + 4|\overline{\alpha}|\sin\left(\frac{\theta}{2}\right)\left[|\overline{\alpha}|\sin\left(\frac{\theta}{2}\right) - \sin\left(\phi_{\overline{\alpha}} - \phi(x', y') + \frac{\theta}{2}\right)\right] \quad (6)$$

Requiring that $|o(x_o', y_o')|^2 \equiv 0$ corresponding to complete darkness as the lowest intensity level in regions $(x_o', y_o') \in \Re_o'$ implies:

$$1 + 4|\overline{\alpha}|\sin\left(\frac{\theta}{2}\right)\left[|\overline{\alpha}|\sin\left(\frac{\theta}{2}\right) - \sin\left(\phi_{\overline{\alpha}} - \phi_o + \frac{\theta}{2}\right)\right] = 0 \quad (7)$$

where the abbreviation $\phi_o = \phi(x_o', y_o')$ has been used.

The solutions to Eq. (7) are given by:

$$|\overline{\alpha}| = \frac{\sin\left(\phi_\alpha - \phi_o + \frac{\theta}{2}\right) \pm \sqrt{\sin^2\left(\phi_\alpha - \phi_o + \frac{\theta}{2}\right) - 1}}{2\sin\left(\frac{\theta}{2}\right)} \quad (8)$$

The requirement $o < |\overline{\alpha}| < 1$ implies that:

$$\sin^2\left(\phi_n - \phi_o + \frac{\theta}{2}\right) = 1 \Rightarrow \quad (9)$$

leading to $$|\overline{\alpha}| = \frac{\pm 1}{2\sin\left(\frac{\theta}{2}\right)} \Rightarrow \frac{1}{2} \leq |\overline{\alpha}| < 1 \quad (10)$$

where the +sign is for $\theta$-values in the interval:

$$\theta \in \left]\frac{\pi}{3}; \frac{5\pi}{3}\right[ + p_{even}2\pi \quad (11)$$

and the −sign is for $\theta$-values:

$$\theta \in \left]\frac{\pi}{3}; \frac{5\pi}{3}\right[ + p_{odd}2\pi \quad (12)$$

The corresponding interval for $(\phi_{\overline{\alpha}} - \phi_o)$ is:

$$(\phi_{\overline{\alpha}} - \phi_o) \in \left]\frac{\pi}{3}; -\frac{\pi}{3}\right[ \quad (13)$$

Inserting the expression for $|\overline{\alpha}|$, one obtains the simple intensity expression:

$$|o(x', y')|^2 = 2\left[1 \mp \sin\left(\phi_\alpha - \phi(x', y') + \frac{\theta}{2}\right)\right] \quad (14)$$

where $$\int_{\Delta x}\int_{\Delta y} \exp(i\phi(x, y)) dx dy = \Delta x \Delta y |\overline{\alpha}| \exp(i\phi_{\overline{\alpha}}) \quad (15)$$

The phase-only transformations imply that energy is conserved:

$$\int_{\Delta x}\int_{\Delta y} |o(x', y')|^2 dx' dy' = \int_{\Delta x}\int_{\Delta y} |a(x, y)|^2 dx dy = \Delta x \Delta y \quad (16)$$

A Special Case:

The most convenient choice for $\overline{\alpha}$ is $$\overline{\alpha} = \frac{1}{2}$$

implying that $\theta = \pi + p_{even}2\pi$), so that the output intensity can be described as:

$$|o(x', y')|^2 = 2[1 - \cos(\phi(x', y'))] \quad (17)$$

In this case the phase→intensity mapping is described by the intervals $[0; \pi] \to [0;4]$. By setting $$\overline{\alpha} = \frac{1}{2}$$

one obtains the following requirements to the phase function $\phi(x, y)$:

$$\begin{cases} \int\int_{\Delta x}\int_{\Delta y} \cos(\phi(x, y)) dx dy = \frac{\Delta x \Delta y}{2} \\ \int\int_{\Delta x}\int_{\Delta y} \sin(\phi(x, y)) dx dy = 0 \end{cases} \quad (18)$$

Inserting the expression for $|o(x', y')|^2$ in Eq. (16) yields:

$$2\int_{\Delta x}\int_{\Delta y} [1 - \cos(\phi(x', y'))] dx' dy' = \Delta x \Delta y \quad (19)$$

in accordance with the first of the integral expressions in Eq. (18).

Encoding Procedure:

A given intensity distribution (image) $|o(x', y')|^2$ is desired at the output side of the optical set-up.

Pixellation of the image, that is generally represented in the greyscale range: [0; gmax], provides the relation:

$$\int\int |o(x', y')|^2 dx' dy' = \Delta x \Delta y \Rightarrow \sum_{ij} |o(i, j)|^2 = \frac{g\max}{4} \# \, pix_{(\Delta x \Delta y)}.$$

The histogram for the desired image $|o(i, j)|^2$ is adjusted (adj.) within the greyscale range [0; gmax], so that the previous point is fulfilled:

$$|o(i,j)|^2 \rightarrow |o(i,j)|_{adj}^2.$$

The phase values can now be calculated as:

$$\phi(i, j) = \arccos\left(1 - \frac{2|o(i, j)|_{adj}^2}{g\max}\right).$$

As before pixellation provides the relation:

$$\sum_{ij} \sin(\phi(i, j)) = 0.$$

The previous point can now be fulfilled by complex conjugating half the input pixels having the same phase value in the phase histogram.

The phase conjugate phase flipping provides a valuable tool (an extra degree of freedom) for manipulating the spatial frequency content in order to optimise the separation of low and high frequency terms at the filter plane.

The scheme is robust to constant phase errors across the input spatial phase modulator, since Eq. (14) is a function of the difference: $\phi_{\overline{\alpha}} - \phi(i, j)$, only. Furthermore, small variations in the individual pixel phase values do not introduce any detrimental effects because the average value $\overline{\alpha}$, is a result of a very large phasor sum.

If the desired intensity distribution is too small to include all energy, that is, the histogram is scaled to maximum and the left hand side of Eq. (16) is still smaller than the right hand side, then the input phase object can be scaled until Eq. (16) is fulfilled. In order to obtain a scale invariant output intensity level a dynamic focusing system is needed. Similarly, intensity invariance can be obtained by controlling the radiated power from the light source. Alternatively, one can ignore the residual background illumination and obtain intensity levels with a gain factor of 9–(background constant equal to 1–) for narrow generally shaped line structures (e.g. Eq. (6)).

EXAMPLE 1

A very simple example illustrating the individual steps in the above procedure will be given below. To simplify the example it will be considered in one dimension only. The starting point for encoding the encoder in this example is based on the following parameters:

$$\begin{cases} \overline{\alpha} = 0.5 \\ \theta = \pi \\ \# \, pix_{(\Delta x)} = 14 \\ g\max = 4 \end{cases} \quad (20)$$

Figure 5:
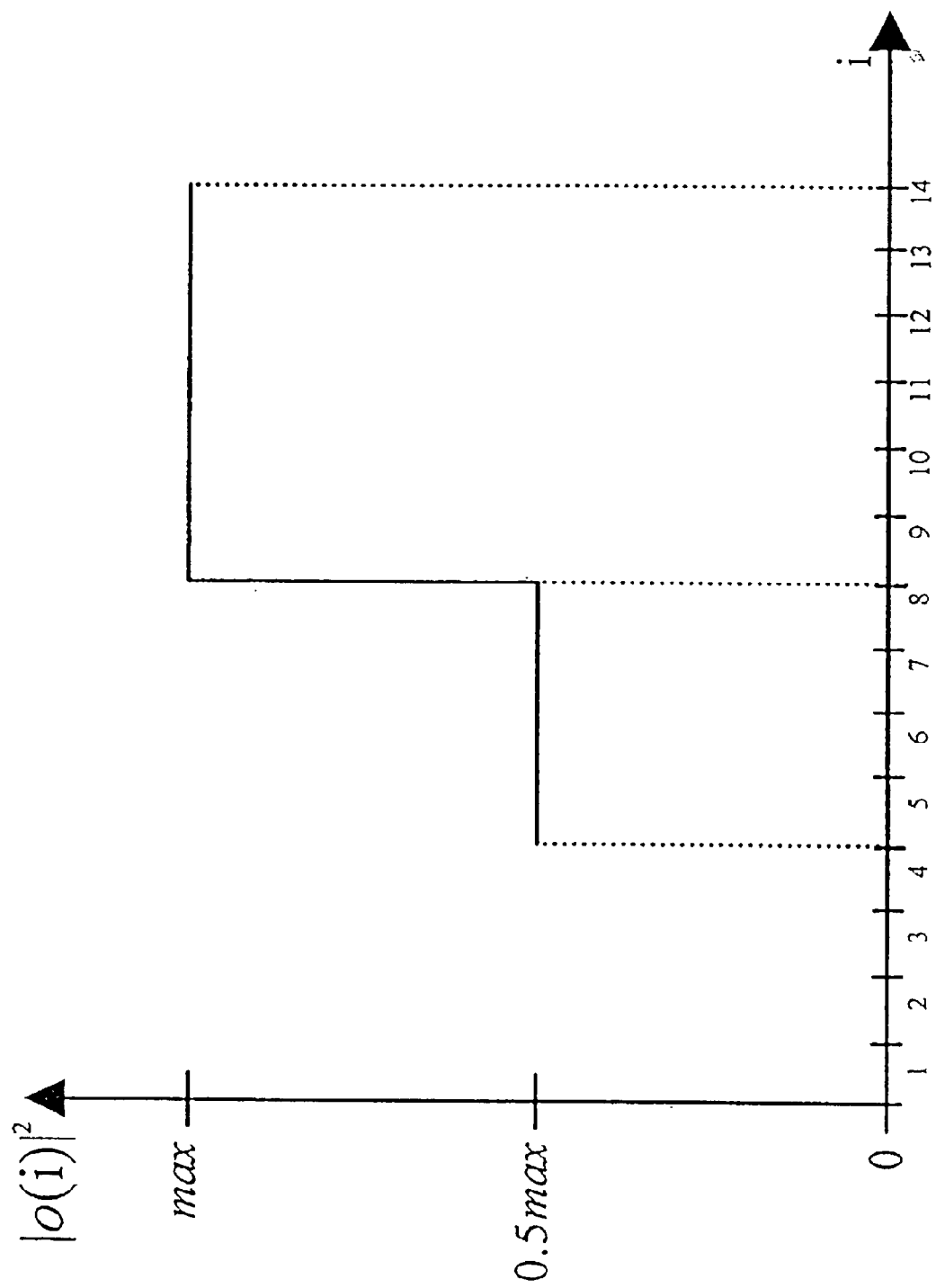
FIG. 5 shows schematically an example of a prescribed intensity pattern in 1D.

Consider the pixellated 3-step function shown in FIG. 5 to be reconstructed in the image plane as an intensity distribution. From the above choices of parameters one obtains the simple relation between phase values in the encoder and the image intensity values:

$$|o(i)|^2 = 2[1 - \cos(\phi(i))] \quad (21)$$

To proceed from here it necessary to calculate the accumulated intensity $$\sum_i |o(i)|^2$$

in the image to be reconstructed. The accumulated intensity is easily calculated from an image histogram where the x-axis represents grey level value and the y-axis represents the amount of pixels in the image at a given grey level value. By use of a histogram $$\sum_i |o(i)|^2$$

is simply found as the weighted sum of all grey level values x-axis) multiplied by their pixel counting (y-axis). This describes, so to speak, the "weight" of the image. In this simple example histogram calculations are not needed since we only have 3 grey levels with well-defined separations.

The value for the accumulated intensity has to obey the equality:

$$\sum_i |o(i)|^2 = \frac{g\max}{4} \# \, pix_{(\Delta x)} = \# \, pix_{(\Delta x)} = 14 \quad (22)$$

From FIG. 5 we obtain:

$$\sum_i |o(i)|^2 = 4pixels \cdot 0 + 4pixels \cdot (0.5\max) + 6pixels \cdot \max = 8\max \quad (23)$$

So that the value for max can be estimated to be:

$$\max = \frac{7}{4} \quad (24)$$

The corresponding adjusted intensity levels, $|o(i)|_{adj}^2$, are therefore: 7/4, 7/8 and 0. These values can now be utilised to calculate the phase values of the encoder from the relation:

$$\phi(i) = \arccos\left(1 - \frac{2|o(i)|^2_{adj}}{g\max}\right) = \arccos\left(1 - \frac{|o(i)|^2_{adj}}{2}\right) \quad (25)$$

where from we obtain the three phase values: 1.45 rad. 0.97 rad and 0 rad. The last step needed in order to encode the encoder is that the following equality is fulfilled:

$$\sum_i \sin(\phi(i)) = 0 \quad (26)$$

Figure 6:
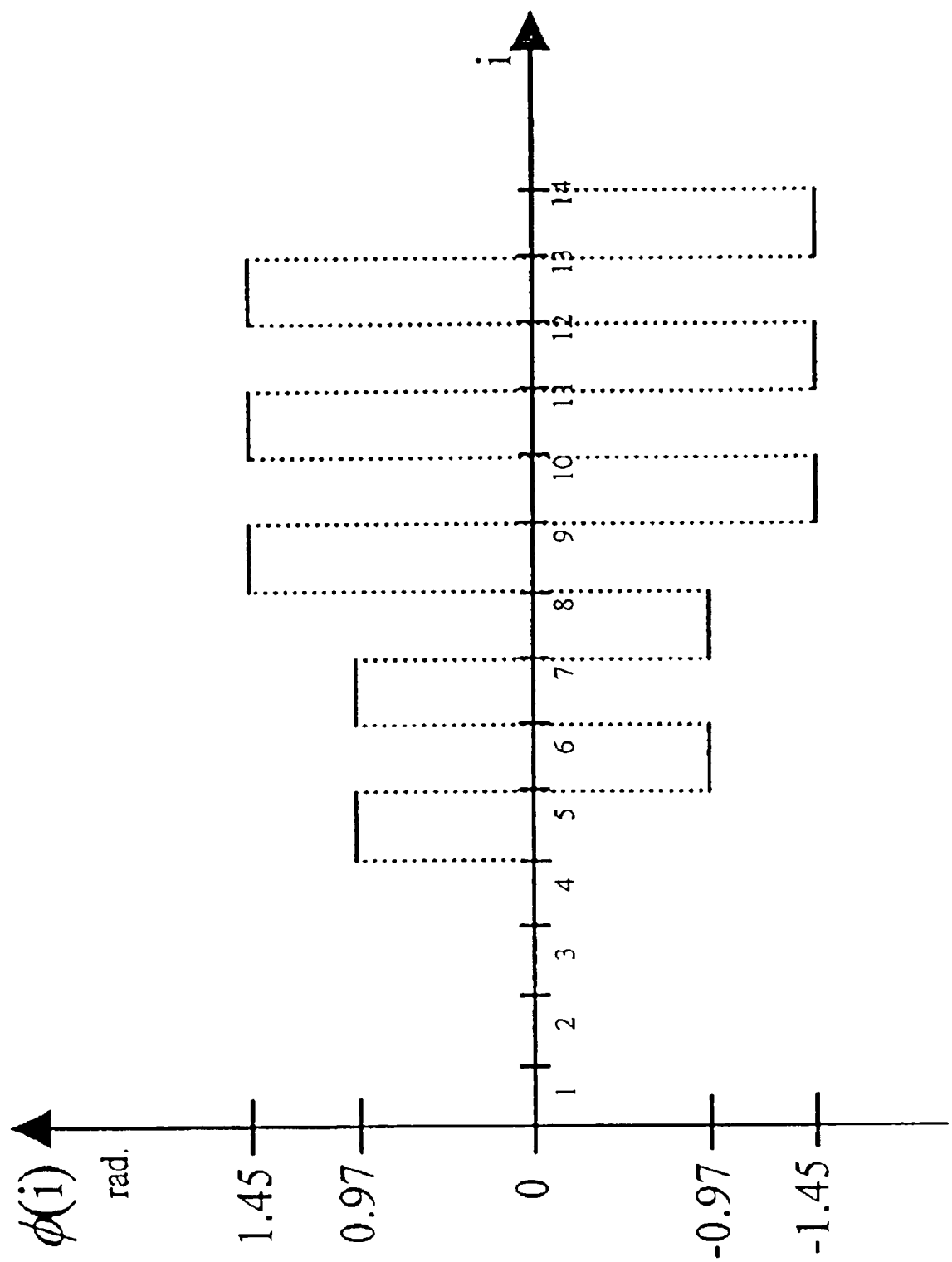
FIG. 6 shows schematically the resulting phase encoding corresponding to FIG. 5.

Since we have the choice to use complex conjugate phasor values (two phasors giving the same intensity level) many approaches can be taken from here. A simple approach is to flip every second phasor with its complex conjugate value as shown in FIG. 6. The final phase values used in the encoder are accordingly: ±1.45 rad. ±0.97 rad and 0 rad.

As the last step we can check whether the criteria: $\bar{\alpha}=\frac{1}{2}$, is actually fulfilled with the chosen phasor encoding:

$$\bar{\alpha} = \frac{1}{14}(4 \exp(i0) + 2 \exp(i0.97) + \quad (27)$$
$$3 \exp(i1.45) + 2 \exp(-i0.97) + 3 \exp(-i1.45)) \equiv 1/2$$

General Phase Correction Procedure Integrated with the Phase Encoding

In Eq. (6) we obtained an analytic relation between the phase values in the encoder and the resulting intensity distribution, within the region (x', y')∈ℜ':

$$|o(x', y')|^2 \cong 1 + 4|\bar{\alpha}|\sin\left(\frac{\theta}{2}\right)\left[|\bar{\alpha}|\sin\left(\frac{\theta}{2}\right) - \sin\left(\phi_{\bar{\alpha}} - \phi(x', y') + \frac{\theta}{2}\right)\right] \quad (28)$$

The analysis leading to the above relation was based on the assumption that $|\bar{\alpha}|$ is a constant value within the ℜ'-domain. In other words, the following approximation was applied:

$$\mathfrak{I}^{-1}\left(\mathfrak{I}(a(x, y))circ\left(\frac{f_r}{\Delta f_r}\right)\right) \cong \bar{\alpha} rect\left(\frac{x'}{\Delta x'}, \frac{y'}{\Delta y'}\right) \quad (29)$$

However, for certain spatial filter parameters the left-hand side of this expression will not be a space invariant constant value throughout the whole ℜ'-domain but will instead manifest slowly variations/oscillations. This will introduce small errors in the final superposition between the phase filtered DC-value and the direct propagated AC-signal. In order to circumvent this problem a technique is needed that can counteract the distortions by use of phase-only encoding in the components already present in the system. In what follows a procedure for integrating pre-distortion that counteracts the above mentioned distortions will be described that is purely based on modifying the phasor values in the encoder at the input side of the system. The method can also counteract other types of distortions inherent in a practical implementation of the system. Furthermore, the method can be applied in systems filtering at other spatial frequencies than DC.

Procedure:

When encoding the input phase function it is helpful to have a 'reverse' equation, expressing the input phase distribution as a function of an adjusted (electronic) image grey-level distribution, $I_{slm}$, addressing the input spatial light modulator:

$$\frac{4I_{slm}}{g\max} \cong 1 + 4|\bar{\alpha}(x', y')|\sin\left(\frac{\theta}{2}\right)\left[|\bar{\alpha}(x', y')|\sin\left(\frac{\theta}{2}\right) - \sin\left(\phi_{\bar{\alpha}}(x', y') - \phi(x', y') + \frac{\theta}{2}\right)\right] \quad (30)$$

where it has been taken into account that $\bar{\alpha}(x', y')$ is not considered as a constant but manifests a smooth oscillating behaviour within the optical image domain. The maximum value of $I_{slm}$ is denoted gmax.

Now, one can derive a formula for the 'grey-level correction' $\Delta I_{slm}(x', y')$ that one needs to apply in order to encode a phase function that compensates for the spatial variation of the average phase value $\bar{\alpha}(x', y')$:

$$\begin{cases} \frac{4I_{slm}(x', y')}{g\max} \cong 1 + 4|\bar{\alpha}(x', y')|\sin\left(\frac{\theta}{2}\right)\left[|\bar{\alpha}(x', y')|\sin\left(\frac{\theta}{2}\right) - \sin\left(\phi_{\bar{\alpha}}(x', y') - \phi(x', y') + \frac{\theta}{2}\right)\right] \\ \phi(x', y') = a\cos\left(1 - \frac{2(I_{slm}(x', y') + \Delta I_{slm}(x', y'))}{g\max}\right) \end{cases} \quad (31)$$

where the second relation has been derived from the first by setting $\bar{\alpha}=\frac{1}{2}$ and $\theta=\pi$.

By inserting the second relation in the first expression one gets:

$$\Delta I_{slm}(x', y') = \quad (32)$$
$$\left(\frac{1}{2|\bar{\alpha}(x', y')|} - 1\right)I_{slm}(x', y') - \frac{g\max}{2|\bar{\alpha}(x', y')|}\left(|\bar{\alpha}(x', y')| - \frac{1}{2}\right)^2$$

This formula is however not directly useful because it is related to the histogram adjusted grey-level distribution denoted by $I_{slm}$.

One needs a formula that relates the above correction term to the 'original' input grey-level distribution I(x, y) that has not been modified by histogram adjustments. This is important since the effect of the grey-level corrections also have to be incorporated in the procedure of histogram adjustments.

The histogram scaling gives:

$$I(x, y) = \frac{I_{max}}{I_{slm,max}} I_{slm}(x, y) \quad (33)$$

where $I_{max}$ and $I_{slm,max}$ are the maximum grey-level values occurring in the original and the adjusted electronic grey-level distributions respectively.

Similarly, one can apply this relation to the intensity correction term $\Delta I_{slm}$ and obtain:

$$\tilde{I}(x, y) = I(x, y) + \Delta I(x, y) = \frac{I_{\max}}{I_{slm,\max}}(I_{slm}(x, y) + \Delta I_{slm}(x, y)) \quad (34)$$

resulting in:

$$\tilde{I}(x, y) = \frac{1}{2|\overline{\alpha}(x', y')|}\left(I(x, y) - g\max\frac{I_{\max}}{I_{slm,\max}}\left(|\overline{\alpha}(x', y')| - \frac{1}{2}\right)^2\right) \quad (35)$$

In order to have 'enough dynamic range' in grey-levels for the correction term one can derive an inequality from the above relation by using the fact that $\tilde{I}_{max} \leq g\max$:

$$\frac{1}{2|\overline{\alpha}_{\min}|}\left(I_{\max} - g\max\frac{I_{\max}}{I_{slm,\max}}\left(|\overline{\alpha}_{\min}| - \frac{1}{2}\right)^2\right) \leq g\max \text{ or} \quad (36)$$

$$I_{\max} \leq \frac{2|\overline{\alpha}_{\min}| \cdot g\max}{\left(1 - \frac{g\max}{I_{slm,\max}}\left(|\overline{\alpha}_{\min}| - \frac{1}{2}\right)^2\right)} \quad (37)$$

Since the first term is the dominating term in the expression for the intensity correction it will in practice be sufficient just to have the much simpler corrections:

$$\begin{cases} \tilde{I}(x, y) = \frac{I(x, y)}{2|\overline{\alpha}(x', y')|} \\ I_{\max} \leq 2|\overline{\alpha}_{\min}| \cdot g\max \end{cases} \quad (38)$$

Binary Phase Image Encryption and Decryption Method

Figure 7:
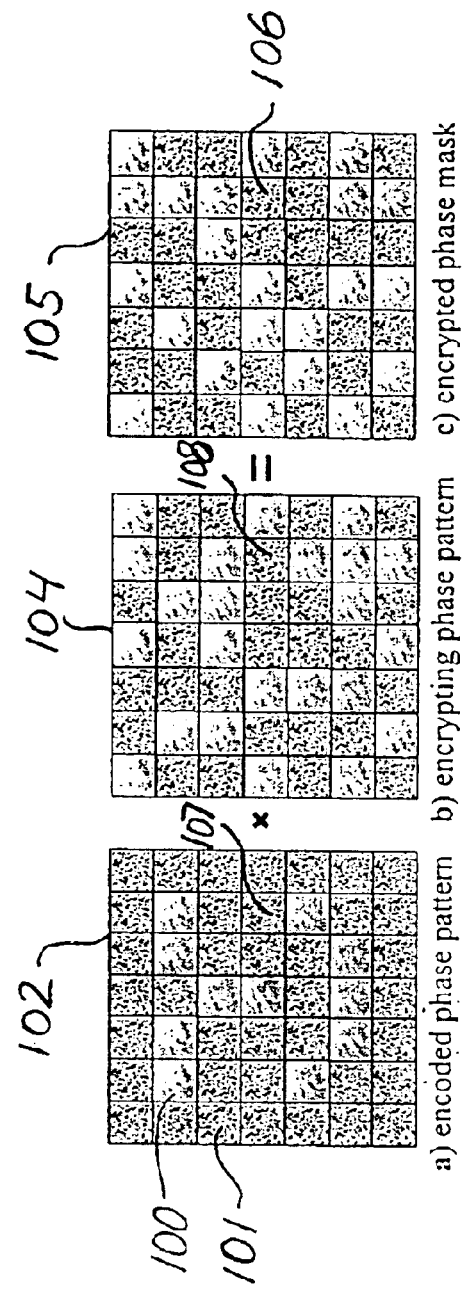
FIG. 7 illustrates a binary phase image encryption method according to the present invention.
Figure 8:
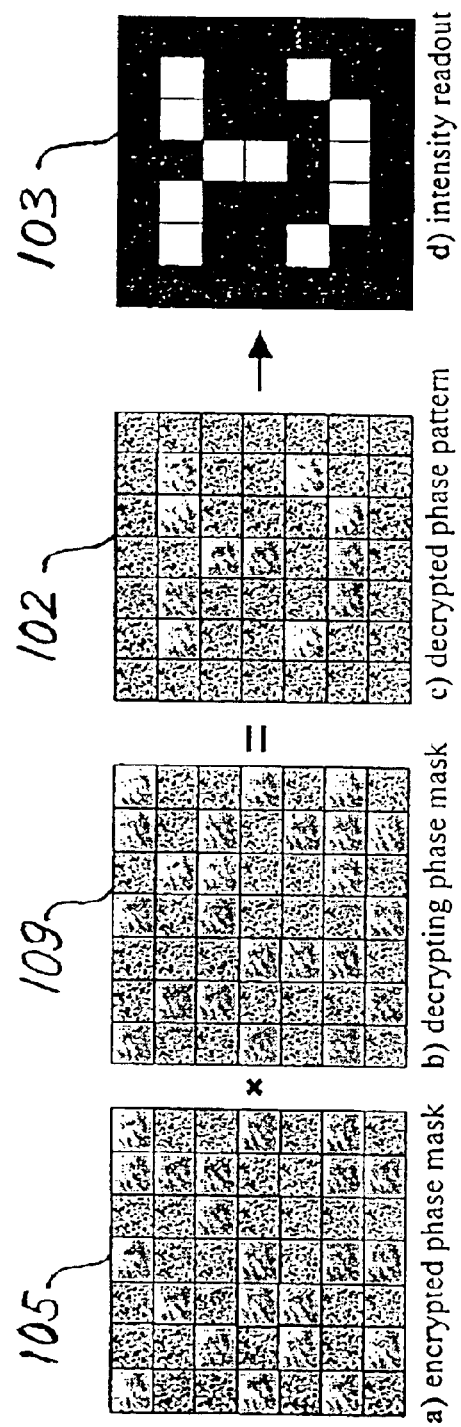
FIG. 8 illustrates a binary phase image decryption method according to the present invention.

FIG. 7 illustrates a binary phase image encryption method and FIG. 8 illustrates a binary phase image decryption method according to the present invention. In the illustrated example the modulating phase values are 0 or π. In FIGS. 7 and 8 bright resolution elements 100 have the phase shift value 0 and the dark resolution elements 101 have the phase shift value π.

The encryption method comprises the steps of
1) calculating, according to the mathematical method described above and in WO 96134307, the modulating phase values (0,π) of the resolution elements forming a binary encoded phase pattern 102 that is imaged onto the intensity pattern 103, e.g. by one of the systems illustrated in FIGS. 1–3,
2) generating a uniform random distribution 104 of binary phase values (0,π),
3) forming an encrypted phase mask 105, 4a, 23a, 43a, 50a, 51a by adding, for each resolution element 106 of the encrypted mask 105, the calculated phase value 107 (0 or π) and the corresponding generated random phase value 108 (0 or π) of the resolution element, whereby a uniform random distribution of binary phase values (0,π) is generated in the encrypted phase mask 105 encrypting the image 103, and the decryption method comprises the step of reconstructing the image 103 by
4) adding the binary phase shift value (0,π) of each resolution element of the encrypted phase mask 105 to a binary phase shift value (0,π) of a corresponding resolution element of a decrypting phase mask 109, 4b, 23b, 43b, 50b, 51b with resolution elements having the respective calculated phase values 104, whereby the original encoded phase pattern 102 is reconstructed.

The decrypting step 4) may be performed by aligning the encrypted phase mask 105 and the decrypting phase mask 109 in one of the optical systems illustrated in FIGS. 1–3, whereby the original image 103 is reconstructed, e.g. for detection by a camera and recognition by a computer.

It should be noted that in the above example, encrypting and decrypting phase values of corresponding resolution elements are identical.

Utilisation of 0 and π as the binary phase values provides a particular robust encryption and decryption approach with a low sensitivity to perturbations of the masks because of the relatively large phase difference between the binary values of the mask.

Figure 9:
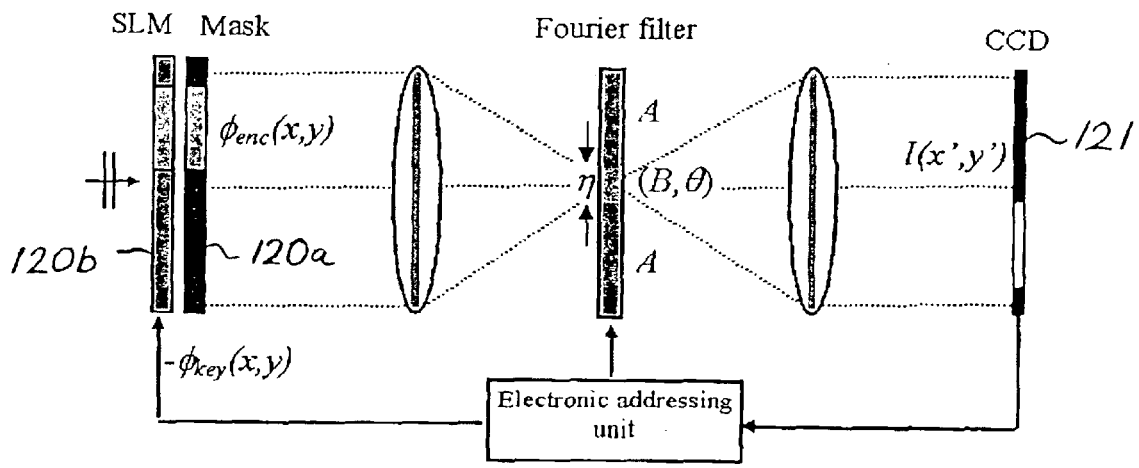
FIG. 9 illustrates alignment of an encrypted phase mask and a decrypting phase mask.

In the common path interferometer illustrated in FIG. 9, the decrypting mask 120b is a spatial light modulator with a modulating region that is larger than the encrypted phase mask 120a. Thus, the encrypted phase mask 120a and the decrypting mask 120b can be aligned electronically by appropriate control of the spatial light modulator 120b. For example, the encrypted mask may contain regions with non-encrypted patterns that are imaged onto the CCD detector array 121 for the purpose of alignment. The positions of the imaged alignment patterns are detected and the spatial light modulator 120b is subsequently controlled accordingly whereby the decrypting resolution elements of the light modulator 120b are aligned with the resolution elements of the encrypted phase mask 120a.

What is claimed is:

1. A method of decryption of an encrypted image having a non-encrypted image intensity pattern I(x',y') and
   encoded into a mask having a plurality of mask resolution elements $(x_m, y_m)$ with an encoded phase value $\phi(x_m, y_m)$ and an encoded amplitude value $a(x_m, y_m)$ and
   encrypted by addition of an encrypting phase value $\phi_c(x_m, y_m)$ to the encoded phase values $\phi(x_m, y_m)$ and by multiplication of an encrypting amplitude value $a_c(x_m, y_m)$ with the encoded amplitude value $a(x_m, y_m)$
   each mask resolution element $(x_m, y_m)$ modulating the phase and the amplitude of electromagnetic radiation incident upon it with the complex value $a(x_m, y_m)a_c(x_m, y_m)e^{i\phi(xm,ym)-i\phi_c(xm,ym)}$, and
   the method comprising the steps of
   radiating electromagnetic radiation towards the mask,
   inserting into the path of the electromagnetic radiation a complex spatial electromagnetic radiation modulator comprising modulator resolution elements $(x_d, y_d)$, each modulator resolution element $(x_d, y_d)$ modulating the phase and the amplitude of electromagnetic radiation incident upon it with a predetermined complex value $a_d(x_d, y_d)e^{i\phi_d(xd,yd)}$, the decrypting phase value $\phi_d(x_d, y_d)$ and the decrypting amplitude value $a_d(x_d, y_d)$, respectively, of a modulator resolution element $(x_d, y_d)$ being substantially equal to $-\phi_c(x_m, y_m)$ and $a_c^{-1}(x_m, y_m)$, respectively, of a corresponding mask resolution element $(x_m, y_m)$, and
   imaging the mask and the electromagnetic radiation modulator onto the image having the image intensity pattern I(x',y').

2. A method according to claim 1, wherein the step of imaging comprises imaging with a common path interferometer.

3. A method according to claim 2, further comprising the steps of
   Fourier or Fresnel transforming electromagnetic radiation modulated by the mask and the complex spatial electromagnetic radiation modulator,
   filtering the Fourier or Fresnel transformed electromagnetic radiation by
   in a region of spatial frequencies comprising DC in the Fourier or Fresnel plane, phase shifting with a predetermined phase shift value θ the modulated electromagnetic radiation in relation to the remaining part of the electromagnetic radiation, and multiplying the amplitude of the modulated electromagnetic radiation with a constant B, and in a region of remaining spatial frequencies in the Fourier or Fresnel plane, multiplying the amplitude of the modulated electromagnetic radiation with a constant A, forming the intensity pattern by Fourier or Fresnel transforming, respectively, the phase shifted Fourier or Fresnel transformed modulated electromagnetic radiation, whereby each resolution element $(x_m,y_m)$ of the mask is imaged on a corresponding resolution element $(x',y')$ of the image, the filtering parameters A, B, θ substantially fulfilling the equation $$I(x',y')=A^2|a(x',y')e^{i\phi(x',y')}+\overline{\alpha}(BA^{-1}e^{i\theta}-1)|^2$$

$\overline{\alpha}$ being the average of the complex phasors $a(x,y)e^{i\phi(x,y)}$.

4. A method according to claim 3, wherein the filtering parameters A and B substantially fulfil that A=1 and B=1, and wherein the absorption of the mask is substantially uniform.

5. A method according to claim 4, wherein the phase shift value θ a substantially fulfils the equation $$|\overline{\alpha}| = \frac{1}{2\left|\sin\frac{\theta}{2}\right|}.$$

6. A method according to claim 5, wherein the phase shift θ is substantially equal to π.

7. A method according to claim 1, wherein the step of imaging comprises phase contrast imaging.

8. A method according to claim 7, further comprising the steps of moving the DC-part of the electromagnetic radiation to a second part of the Fourier or Fresnel plane, and phase shifting the Fourier or Fresnel transformed modulated electromagnetic radiation at the second part of the Fourier or Fresnel plane by θ in relation to the remaining part of the electromagnetic radiation.

9. A method according to claim 8, wherein the step of moving the DC-part of the electromagnetic radiation comprises utilisation of an optical component, such as a grating, a prism, etc, with an appropriate carrier frequency.

10. A method according to claim 7, further comprising the step of phase shifting at selected spatial frequencies constituting a region that is shaped to match the spatial frequency content of the phasors $e^{i\phi(x,y)}$.

11. A method according to claim 7, wherein the step of filtering comprises utilisation of a spatial light modulator.

12. A method according to claim 7, further comprising the step of encoding the optical function of an output lens into the filter.

13. A method according to claim 7, wherein the step of radiating electromagnetic radiation comprises radiation of electromagnetic radiation of different wavelengths corresponding to three different colours, such as red, green and blue, for generation of intensity patterns of arbitrary colours.

14. A method of encryption of an image having an intensity pattern $I(x',y')$ to be decrypted according to claim 1, comprising the steps of pixellating the intensity pattern $I(x',y')$ in accordance with the disposition of resolution elements $(x_m,y_m)$ of a mask, encoding the mask with an encoded phase value $\phi(x_{m,ym})$ and an encoded amplitude value $a(x_m,y_m)$, and encrypting by addition of an encrypting phase value $\phi_c(x_m,y_m)$ to the encoded phase values $\phi(x_m,y_m)$ and by multiplication of an encrypting amplitude value $a_c(x_m,y_m)$ with the encoded amplitude value $a(x_m,y_m)$, each mask resolution element $(x_m,y_m)$ modulating the phase and the amplitude of electromagnetic radiation incident upon it with the complex value $a(x_m,y_m)a_c(x_m,y_m)e^{i\phi(xm,ym)+i\phi c(xm,ym)}$.

15. A method according to claim 14, further comprising the step of calculating the complex phasor values $a(x,y)e^{i\phi(x,y)}$ of the encoder in accordance with $$I(x',y')=A^2|a(x',y')e^{i\phi(x',y')}+\overline{\alpha}(BA^{-1}e^{i\theta}-1)|^2$$

for selected phase shift values θ, $\overline{\alpha}$ being the average of the complex phasors $a(x,y)e^{i\phi(x,y)}$, selecting, for each resolution element, one of two phasor values which represent a particular grey level.

16. A method according to claim 15, wherein the filtering parameters A and B substantially fulfil that A=1 and B=1, and wherein the absorption of the mask is substantially uniform.

17. A method according to claim 16, wherein the step of calculating the phasor values comprises setting the reconstructed intensity of at least one resolution element $(x_o', y_o')$ of the intensity pattern to zero, and calculating the phasor values $e^{i\phi(x,y)}$ of the mask in accordance with $$|\overline{\alpha}| = \frac{1}{2\left|\sin\frac{\theta}{2}\right|}$$

$$I(x',y') = 2\left[1 \mp \sin\left(\phi_\alpha - \phi(x', y') + \frac{\theta}{2}\right)\right]$$

for selected phase shift values φ, $\phi_{\overline{\alpha}}$ being the phase of $\overline{\alpha}$.

18. A method according to claim 17, further comprising the step of selecting the phase shift θ=π, selecting $|\overline{\alpha}|$=½, and calculating the phasor values $e^{i\phi(x,y)}$ of the encoder in accordance with $$I(x',y')=2(1-\cos(\phi(x',y')))$$

$$\int_{encoder}\int \sin(\phi(x, y))dx\,dy = 0.$$

19. A method according to claim 14, further comprising the step of encoding the function of an optical component, such as a grating, a prism, etc, with an appropriate carrier frequency, into the mask.

20. A method according to claim 14, further comprising the step of adjusting the modulus of the Fourier transform of the complex phasors $a(x,y)e^{i\phi(x,y)}$ at specific spatial frequencies in order to control the range of intensity levels of the reconstructed intensity pattern.

21. A method according to claim 20, wherein the step of adjusting the modulus of the Fourier transform of the complex phasors $a(x,y)e^{i\phi(x,y)}$ at specific spatial frequencies comprises at least one of the following measures:

a) adjusting the individual complex phasors $a(x,y)e^{i\phi(x,y)}$ of the resolution elements of the mask maintaining prescribed relative intensity levels between intensities of resolution elements of the intensity pattern, b) adjusting the individual complex phasors $a(x,y)e^{i\phi(x,y)}$ of the resolution elements of the mask by histogram techniques, c) spatially scaling the complex phasor $a(x,y)e^{i\phi(x,y)}$ pattern of the mask, and d) utilising half tone coding techniques.

22. A method according to claim 14, wherein each complex phasor $a(x,y)e^{i\phi(x,y)}$ of the mask is selected from a set of two determined phasors with complementary complex phasor values $a(x,y)e^{i\phi 1(x,y)}$ and $a(x,y)e^{i\phi 2(x,y)}$ in such a way that a specific spatial frequency distribution of the intensity of the electromagnetic radiation in the Fourier or Fresnel plane is attained.

23. A method according to claim 22, wherein the phase $\phi(x,y)$ of complex phasors $a(x,y)e^{i\phi(x,y)}$ of adjacent resolution elements alternates between the two possible complementary complex phasor values $a(x,y)e^{i\phi 1(x,y)}$ and $a(x,y)e^{i\phi 2(x,y)}$.

24. A method according to claim 22, wherein the complex phasors $a(x,y)e^{i\phi 1(x,y)}$ and $a(x,y)e^{i\phi 2(x,y)}$ are complex conjugated.

25. A method according to claim 14, further comprising the step of encoding the optical function of a Fourier-transforming lens into the complex phasors $a(x,y)e^{i\phi(x,y)}$ of the encoder.

26. A method according to claim 14, wherein each of the encrypting phase values $\phi_c(x_m,y_m)$ is substantially equal to a value selected from a set consisting of two phase values.

27. A method according to claims 26, wherein each of the encrypting phase values $\phi_c(x_m,y_m)$ is substantially equal to a value selected from the set consisting of 0 and $\pi$.

28. A decryption system for decrypting an encrypted image having a non-encrypted image intensity pattern $I(x',y')$ that has been encoded into a mask having a plurality of mask resolution elements $(x_m,y_m)$ with an encoded phase value $\phi(x_m,y_m)$ and an encoded amplitude value $a(x_m,y_m)$, and encrypted by addition of an encrypting phase value $\phi(x_m,y_m)$ to the encoded phase values $\phi(x_m,y_m)$ and by multiplication of an encrypting amplitude value $a_c(x_m,y_m)$ with the encoded amplitude value $a(x_m,y_m)$, each mask resolution element $(x_m,y_m)$ modulating the phase and the amplitude of electromagnetic radiation incident upon it with the complex value $a(x_m,y_m)a_c(x_m,y_m)e^{i\phi(xm,ym)+i\phi c(xm,ym)}$, the system comprising a source of electromagnetic radiation for emission of electromagnetic radiation for illumination of the mask, a complex spatial electromagnetic radiation modulator that is positioned in the path of the electromagnetic radiation and comprising modulator resolution elements $(x_d,y_d)$, each modulator resolution element $(x_d,y_d)$ modulating the phase and the amplitude of electromagnetic radiation incident upon it with a predetermined complex value $a_d(x_d,y_d)e^{i\phi d(xd,yd)}$, the decrypting phase value $\phi_d(x_d,y_d)$ and the decrypting amplitude value $a_d(x_d,y_d)$, respectively, of a modulator resolution element $(x_d,y_d)$ being substantially equal to $-\phi_c(x_m,y_m)$ and $a_c^{-1}(x_m,y_m)$, respectively, of a corresponding mask resolution element $(x_m,y_m)$, and an imaging system for imaging the mask and the electromagnetic radiation modulator onto the image having the image intensity pattern $I(x',y')$.

29. A system according to claim 28, wherein the imaging system comprises a common path interferometer.

30. A system according to claim 29, further comprising means for Fourier or Fresnel transforming the electromagnetic radiation modulated by the mask and the complex spatial electromagnetic radiation modulator and being positioned on a propagation axis of the modulated radiation, a spatial filter for filtering the Fourier or Fresnel transformed electromagnetic radiation by in a region of spatial frequencies comprising DC in the Fourier or Fresnel plane, phase shifting with a predetermined phase shift value $\theta$ the modulated electromagnetic radiation in relation to the remaining part of the electromagnetic radiation, and multiplying the amplitude of the modulated electromagnetic radiation with a constant B, and in a region of remaining spatial frequencies in the Fourier or Fresnel plane, multiplying the amplitude of the modulated electromagnetic radiation with a constant A, means for forming the intensity pattern by Fourier or Fresnel transforming, respectively, the phase shifted Fourier or Fresnel transformed modulated electromagnetic radiation, whereby each resolution element $(x_m,y_m)$ of the mask is imaged on a corresponding resolution element $(x',y')$ of the image, the filtering parameters A, B, $\theta$ substantially fulfilling the equation $$I(x',y')=A^2|a(x',y')e^{i\phi(x',y')}+\overline{\alpha}(BA^{-1}e^{i\theta}-1)|^2$$

for selected phase shift values $\theta$, $\overline{\alpha}$ being the average of the complex phasors $a(x,y)e^{i\phi(x,y)}$.

31. A system according to claim 30, wherein the filtering parameters A and B substantially fulfil that A=1 and B=1, and for each $(x,y)$ of the encoder: $a(x,y)=1$.

32. A system according to claim 31, wherein the phase shift value $\theta$ substantially fulfils the equation $$|\overline{\alpha}| = \frac{1}{2\left|\sin\frac{\theta}{2}\right|}.$$

33. A system according to claim 32, wherein the phase shift $\theta$ is substantially equal to $\pi$.

34. A system according to claim 30, wherein the spatial filter comprises a spatial light modulator.

35. A system according to claim 30, wherein the spatial filter is adapted to perform the optical function of an output lens by appropriate encoding of the spatial filter.

36. A system according to claim 30, further comprising a first and a second Fourier transforming lens, the mask being positioned in the front focal plane of the first lens, the spatial filter being positioned at the back focal plane of the first lens, and the second lens being positioned so that its front focal plane is positioned at the position of the back focal plane of the first lens.

37. A system according to claim 30, further comprising one Fourier transforming lens, the spatial filter being positioned at the back focal plane of the lens.

38. A system according to claim 30, further comprising one imaging lens, the spatial filter being positioned in the back focal plane of the lens.

39. A system according to claim 30, further comprising a polarising beam splitter and a quarter wave plate and/or a phase filter reflecting electromagnetic radiation incident upon it.

40. A system according to claim 30, wherein the spatial filter changes the phase of the radiation in the region of spatial frequencies comprising DC and leaves the phase of the remaining part of the radiation unchanged.

41. A system according to claim 30, wherein the spatial filter do not change the phase of the radiation in the region of spatial frequencies comprising DC and changes the phase of the remaining part of the radiation.

42. A system according to claim 30, wherein the spatial filter blocks the radiation at the region of spatial frequencies comprising DC and leaves the remaining part of the radiation unchanged.

43. A system according to claim 30, wherein the source of electromagnetic radiation is a Laser.

44. A system according to claim 28, wherein the source of electromagnetic radiation is adapted to radiate electromagnetic radiation of different wavelengths corresponding to three different colours, such as red, green and blue, for generation of intensity patterns of arbitrary colours.

45. A system according to claim 28, wherein the imaging system comprises a phase contrast imaging system.

46. A system according to claim 45, further comprising means for moving the region of spatial frequencies comprising DC to a second part of the Fourier or Fresnel plane, and wherein the spatial filter is adapted to phase shift the transformed modulated electromagnetic radiation at the second part of the Fourier or Fresnel plane by $\theta$ in relation to the remaining part of the electromagnetic radiation.

47. A system according to claim 46, wherein the means for moving the region of spatial frequencies comprising DC to a second part of the Fourier or Fresnel plane comprises an optical component, such as a grating, a prism, etc, with an appropriate carrier frequency.

48. A system according to claim 28, wherein each of the encrypting phase values $\phi_c(x_m, y_m)$ is substantially equal to a value selected from a set consisting of two phase values.

49. A method according to claims 48, wherein each of the encrypting phase values $\phi_c(x_m, y_m)$ is substantially equal to a value selected from the set consisting of 0 and $\pi$.

* * * * *